(12) United States Patent
Ligouy

(10) Patent No.: US 6,328,327 B1
(45) Date of Patent: Dec. 11, 2001

(54) ADAPTER DEVICE ALLOWING THE DRAWBAR OF AN AGRICULTURAL MACHINE TO BE CONNECTED OPTIMALLY TO A HITCHING BAR OF A TRACTOR

(75) Inventor: Jean-Baptiste Ligouy, Guntzviller (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/556,058

(22) Filed: Apr. 20, 2000

(30) Foreign Application Priority Data

May 11, 1999 (FR) .................................................. 99 06140

(51) Int. Cl.⁷ ...................................................... B60D 1/01
(52) U.S. Cl. ........................................... 280/492; 280/482
(58) Field of Search .................................. 280/504, 462, 280/492, 494, 482

(56) References Cited

U.S. PATENT DOCUMENTS

| | | |
|---|---|---|
| 2,273,410 | 2/1942 | Lux . |
| 3,204,984 | 9/1965 | Walberg . |
| 4,008,905 | 2/1977 | Soteropulos et al. . |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora et al. . |
| 4,811,553 | 3/1989 | Ermacora et al. . |
| 4,833,868 | 5/1989 | Ermacora et al. . |
| 4,848,069 | 7/1989 | Ermacora et al. . |
| 4,947,629 | 8/1990 | Ermacora et al. . |
| 4,986,064 | 1/1991 | Ermacora et al. . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |
| 5,647,604 * | 7/1997 | Russell ................................. 280/492 |
| 5,749,390 | 5/1998 | Ermacora et al. . |
| 5,794,424 | 8/1998 | Ermacora et al. . |
| 5,901,533 | 5/1999 | Ermacora et al. . |
| 5,901,537 | 5/1999 | Walch et al. . |
| 5,966,913 | 10/1999 | Neuerburg . |
| 5,992,133 | 11/1999 | Walch et al. . |
| 6,003,291 | 12/1999 | Ermacora et al. . |

FOREIGN PATENT DOCUMENTS

| | | |
|---|---|---|
| 916 861 | 8/1954 | (DE) . |
| 2 022 389 | 12/1979 | (GB) . |

* cited by examiner

*Primary Examiner*—Brian L. Johnson
*Assistant Examiner*—Matthew Luby
(74) *Attorney, Agent, or Firm*—Oblon, Spivak, McClelland, Maier & Neustadt, P.C.

(57) ABSTRACT

An adapter device comprising an adapter bar equipped with a hitching pin extending vertically when the device is mounted on the hitching bar, and a connecting pin for the hitching bar. The adapter device allows the mechanical play between the hitching bar and the adapter bar to be reduced or cancelled.

26 Claims, 4 Drawing Sheets

ADAPTER DEVICE ALLOWING THE DRAWBAR OF AN AGRICULTURAL MACHINE TO BE CONNECTED OPTIMALLY TO A HITCHING BAR OF A TRACTOR

BACKGROUND OF THE INVENTION

1. Field of the Invention

The present invention relates to the technical field of agricultural machinery and more specifically to the field of accessories used for hitching an agricultural machine to a tractor.

The present invention relates to an adapter device which allows the drawbar of an agricultural machine to be connected optimally to a hitching bar of a tractor. An adapter device of this kind is most particularly applicable in the field of trailed agricultural machines.

2. Discussion of the Background

The production of an adapter device for a hitching bar of agricultural machines comprising:

an adapter bar equipped with a hitching pin near one of its ends, said hitching pin extending substantially vertically when the adapter device is mounted on the hitching bar, and a connecting pin intended to pass through an opening made in said hitching bar, and means of allowing the mechanical play between the hitching bar and the adapter bar to be reduced or cancelled, is known.

Such devices make it possible to optimize the distance between the tractor and the agricultural machine when the latter is driven by the power take-off of said tractor. The power take-off is generally connected to the agricultural machine via a cardan shaft, which consequently limits the inclination between the tractor and the hitching drawbar when said machine is being driven.

Optimizing the distance between the agricultural machine and the tractor power take-off therefore makes it possible to obtain inclinations of the transmission shaft ranging to as much as 45° at a homokinetic joint. Furthermore, when the telescopic transmission shaft adopts its maximum extension, that is to say when the agricultural machine and the tractor are moving along in a straight line, it is essential that the telescopic parts overlap over a minimum distance.

Furthermore, the transmission shaft ends in a cardan joint at each end, thereby reducing the length available for the maximum overlap when the inclination of said transmission shaft is 45° with respect to the direction of traction. All of these conditions impose a minimum length of the hitching bar, that can be achieved using the adapter device. The fact that the hitching bars which are delivered with the tractors are of a standardized length is therefore no longer an impediment to hitching certain types of machine.

The known device consists of an additional hitching bar which, at one of its ends, has a portion in the form of a rectangular tube in which the hitching bar of the tractor can engage. The rectangular tube portion therefore has openings which lie opposite an opening made in the hitching bar so that a connecting pin can be passed through these openings. This pin also passes through a set of shims housed inside the rectangular tube and intended to reduce the vertical mechanical play of the hitching bar in said rectangular tube. A clamping screw, mounted on a side wall, is designed to take up the lateral play of the hitching bar.

Such adapter devices have the drawback of not sufficiently taking up the mechanical play there is between the adapter bar and the hitching bar. Furthermore, the loadings are not transmitted uniformly to the hitching bar and therefore increase wear and the risk of damage.

SUMMARY OF THE INVENTION

The object of the present invention is therefore to produce an adapter device capable of substantially reducing or cancelling the mechanical play between the adapter bar and the hitching bar and of distributing the loadings exerted on said bars more uniformly.

The object of the present invention is achieved with the aid of an adapter device for a hitching bar of an agricultural tractor comprising:

an adapter bar equipped with a hitching pin near one of its ends, said hitching pin extending substantially vertically when the adapter device is mounted on the hitching bar, and a connecting pin intended to pass through an opening made in said hitching bar, and means of allowing the mechanical play between the hitching bar and the adapter bar to be reduced or cancelled, wherein said means for reducing or cancelling the mechanical play between the hitching bar and the adapter bar comprise:

two cheeks mounted laterally one on each side of the adapter bar using two mounting rods, one of the mounting rods acting as an axis about which said adapter bar can pivot with respect to said cheeks, a locking rod connected to the two cheeks and located in a region lying between the two mounting rods, and a clamping screw connected to the adapter bar and bearing against a part secured to at least one of the cheeks so as to be able to clamp the hitching bar between the adapter bar and the locking rod when the clamping screw is turned, said mounting rods being used to clamp the adapter bar and the hitching bar laterally via the two cheeks.

BRIEF DESCRIPTION OF THE DRAWINGS

Other features and advantages will become apparent from the detailed description featured hereinafter, with reference to the appended drawings, given by way of nonlimiting examples and in which.

DESCRIPTION OF THE PREFERRED EMBODIMENTS

Figure 1:
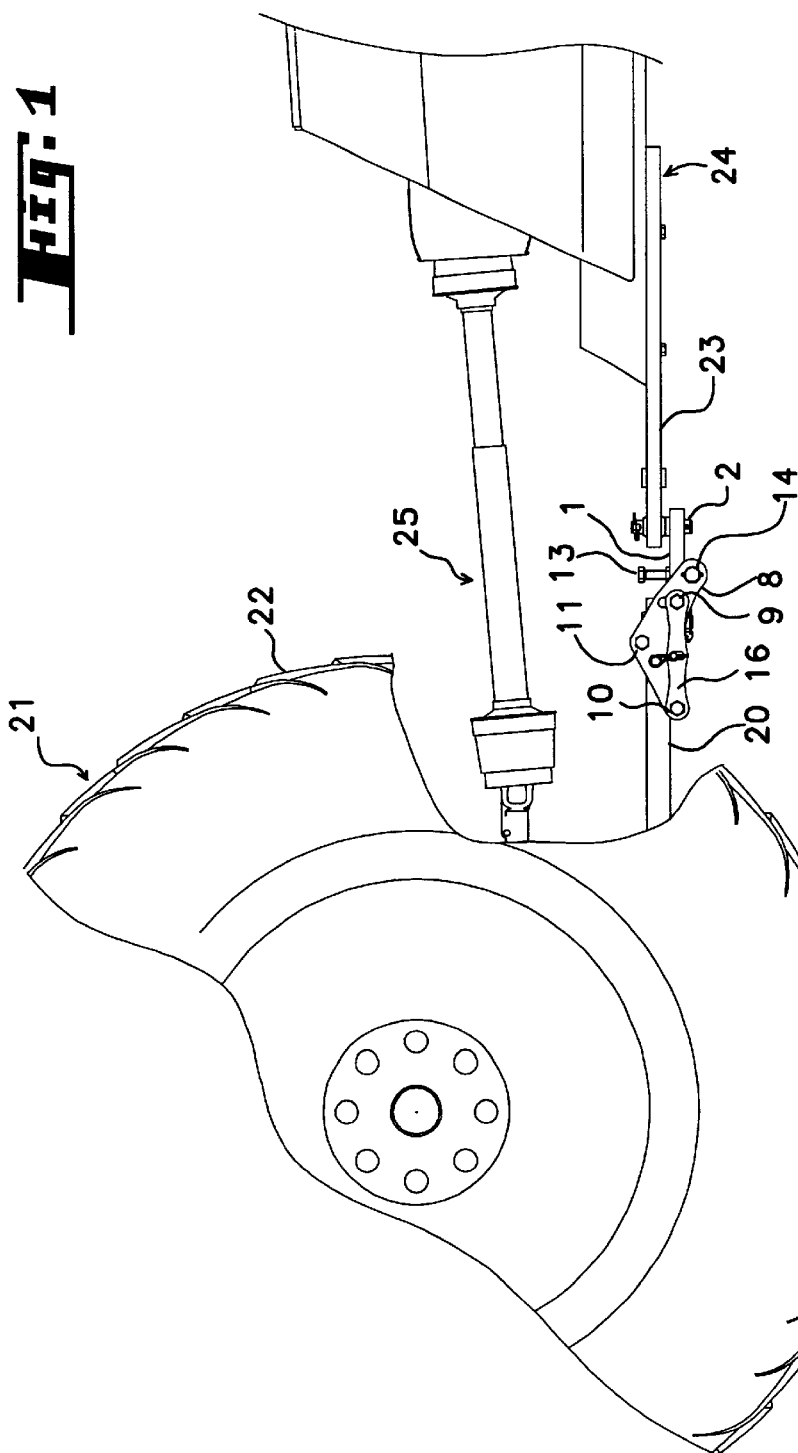
FIG. 1 depicts a partial side view of an agricultural machine hitched to a tractor using an adapter device according to the invention.

FIG. 1 shows the adapter device according to the invention once it has been mounted on a hitching bar 20 of a tractor 1 which is depicted only in part by a wheel 22. The adapter device provides the interface between the hitching bar 20 and a drawbar 23 of an agricultural machine 24. A transmission shaft 25 connecting the agricultural machine to the power take-off of the tractor 21 is also depicted in this FIG. 1.

Figure 2:
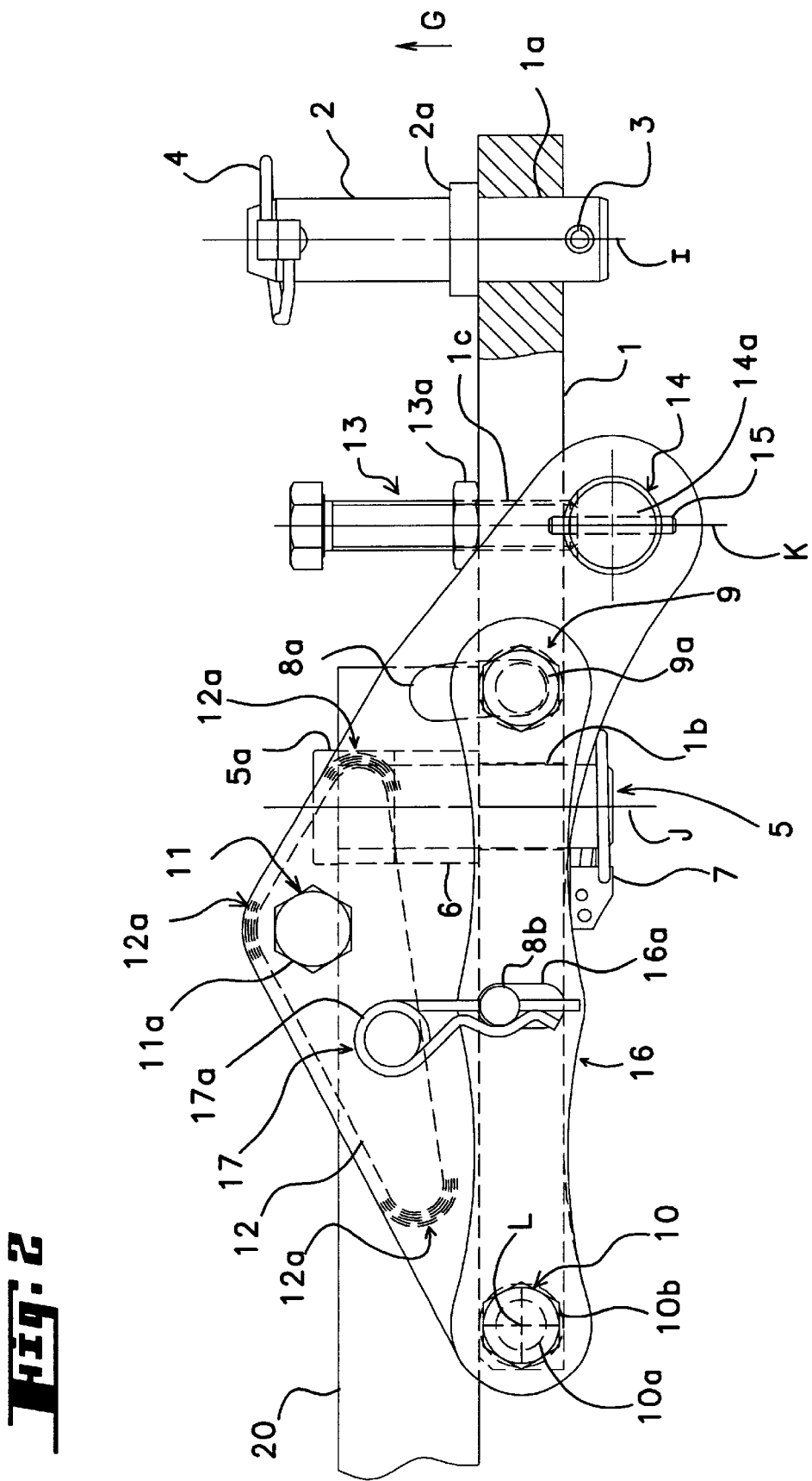
FIG. 2 depicts a side view of an adapter device according to the invention.

The adapter device depicted in greater detail in FIG. 2 comprises an adapter bar 1 with partial cutaway (hatching) to show, at one of its ends, a drilling 1a of axis I and the mounting of a hitching pin 2. The hitching pin 2 rests on the hitching bar 1 by virtue of a shoulder 2a. An elastic pin 3 allows the hitching pin 2 to be held in place. A removable pin 4 can also be mounted on the hitching pin 2, the latter extending at right angles to the plane (horizontal) in which said adapter bar 1 extends. This bar has another drilling 1b of axis J intended for the passage of a connecting pin 5 to allow the adapter device to be connected to a hitching bar 20 (FIG. 1) of a tractor. The connecting pin 5 is advantageously, as the case may be, associated with a bushing 6 to be adapted to a larger diameter of the hitching hole of the hitching bar 20. The connecting pin 5 is, for example, removable, and has a shoulder 5a at one of its ends and another additional removable pin 7 at its other end. FIG. 2 shows the adapter device mounted on the hitching bar 20 of a tractor 21. The connecting pin 5 is therefore mounted removably on the adapter bar 1.

The adapter device also comprises a cheek 8 mounted laterally on each side of the adapter bar 1 using two mounting rods 9, 10 passing through said cheek 8. In this respect, one 10 of the mounting rods 9, 10 acts as an axis about which said adapter bar 1 can pivot with respect to said cheeks 8.

The mounting rod 10 which acts as an axis of pivoting for the adapter bar 1 lies at that end of said adapter bar 1 furthest from the end at which the hitching pin 2 lies. The other mounting rod 9 passes through an opening 8a made in each cheek 8 which allows the adapter bar 1 to pivot with respect to said cheeks 8 of the mounting rod 10 which acts as an axis of pivoting. The opening 8a is preferably an oblong opening substantially centred on the axis L of the mounting rod 10 which acts as an axis of pivoting.

Advantageously, the two mounting rods 9, 10 are substantially parallel.

The two mounting rods 9, 10 extend substantially horizontally when the adapter device is mounted on the hitching bar 20. This oblong opening 8a allows the hitching bar 20 to pivot with respect to the cheek 8 through a travel which is delimited by said oblong opening 8a and the two cheeks 8 are preferably mounted symmetrically with respect to the hitching bar 1. According to one embodiment of the adapter device according to the invention, the mounting rods 9, 10 are screws which are screwed into corresponding tappings 9a, 10a in the hitching bar 20.

Figure 3:
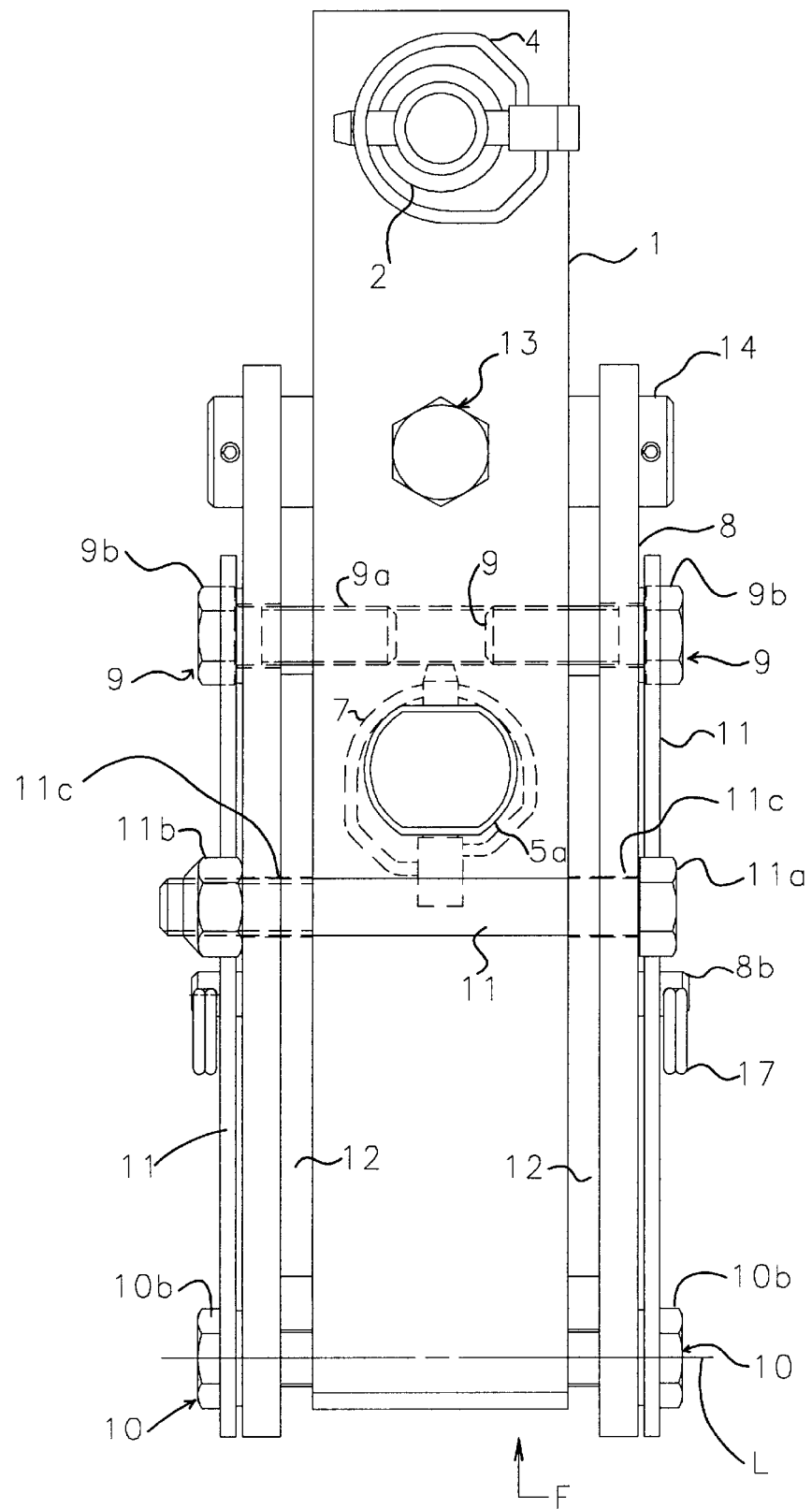
FIG. 3 depicts a top view of the adapter device of FIG. 1.
Figure 4:
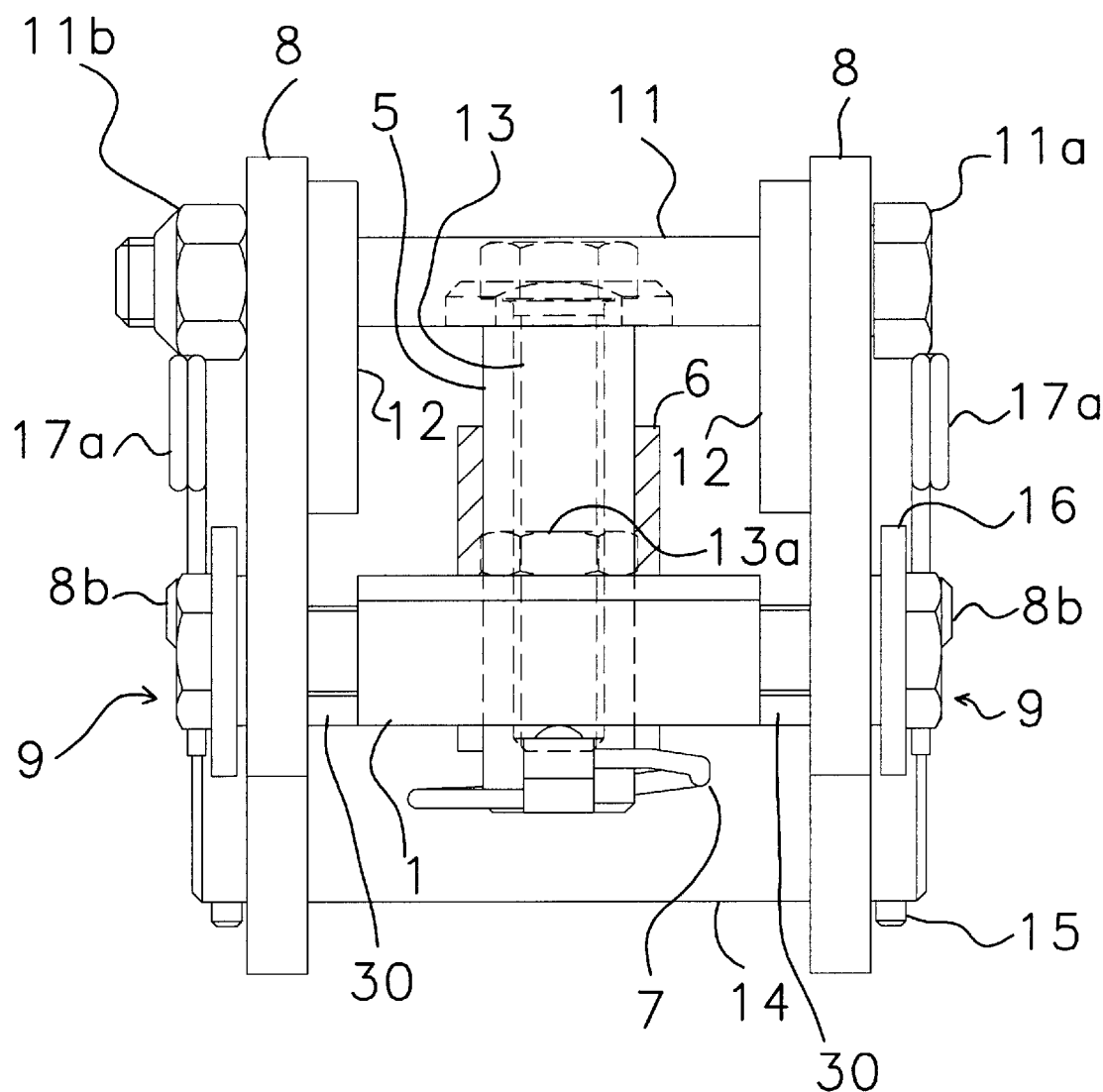
FIG. 4 depicts a front-on view, in the direction F of FIG. 3, of the adapter device according to the invention.

The adapter device according to the invention also comprises a locking rod 11, also depicted in FIGS. 3 and 4. The locking rod 11 is connected to the two cheeks 8 and located in a region running between the two mounting rods 9, 10. Advantageously, the locking rod 11 extends higher up than the two mounting rods 9, 10. The locking rod 11 passes through a corresponding opening 11c in each cheek 8 as depicted, for example, in FIG. 3, and consists of a screw capable of clamping the two cheeks 8 laterally. The locking rod 11 extends substantially parallel to the mounting rod 10 which acts as an axis of pivoting for the adapter bar 1. The locking rod 11 therefore has a screw head 11a and is fitted with a nut 11b bearing on the respective cheek 8 to clamp the cheeks 8 together more firmly.

Advantageously, each cheek 8 is equipped with a bearing plate 12 through which the locking rod 11 passes. The bearing plate 12 is fixed to the corresponding cheek 8 by weld spots 12a. The bearing plates 12 are intended to grip the hitching bar 20 when the adapter device is mounted thereon. The adapter device also comprises a clamping screw 13 connected to the adapter bar 1 and bearing against a part 14 secured to at least one of the cheeks 8 so as to be able to clamp the hitching bar 20 between the adapter bar 1 and the locking rod 11 when the clamping screw 13 is turned. Advantageously, the part 14 against which the clamping screw bears consists of a horizontal pin 14a passing through the cheeks 8 and on which said cheeks can slide laterally. The pin 14a extends substantially parallel to the mounting rod 10 which acts as an axis of pivoting for the hitching bar 20.

The part 14 secured to at least one of the cheeks 8 and against which the clamping screw 13 bears, preferably extends under the adapter bar 1 as can be seen in FIG. 2 in particular.

The clamping screw 13 is substantially parallel to the hitching pin 2 and passes through a hole 1c made in the adapter bar 1. The hole 1c, of axis K, for example parallel to the axes I and J, is a tapped hole.

The clamping screw 13 can thus pass through the adapter bar 1 and project under said adapter bar 1.

The clamping screw 13 can be locked in position on the adapter bar 1 using a lock-nut 13a which can be tightened up against said adapter bar 1.

The end of the clamping screw 13 which projects under the adapter bar 1 bears against a part 14 secured to at least one of the cheeks 8.

Advantageously, the horizontal pin 14a passing through the two cheeks 8 is held in position using elastic pins 15. Thus, once the lock-nut 13a has been slackened, it is possible to increase the spacing between the horizontal pin 14a and the adapter bar 1 still further, the latter bar being pivoted upward in the direction of arrow G of FIG. 2. Such pivoting is not possible until the mounting screws 9, 10 of each cheek 8 have been slackened. The cheeks 8 can slide along the horizontal pin 14a when the latter are moved laterally under the effect of the tightening of the mounting screws 9, 10.

The connecting pin 5 extends, for example, between the two mounting rods 9, 10. Advantageously, the connecting pin 5 extends between the mounting rod 9 closest to the hitching pin 2 and the locking rod 11.

The adapter device according to the invention is also provided with a mechanism 16 for locking the mounting screws 9, 10. The locking mechanism 16 may advantageously be used as a tool for tightening and slackening the mounting screws 9, 10 and possibly the locking rod 11. The locking mechanism 16 therefore has openings, the shape of which complements the shape of the head 9b, 10b of the mounting screws 9, 10 and possibly of the locking rod 11. This complementary shape, for example hexagonal, allows the mounting screws 9, 10 to be locked in rotation when the locking mechanism 16 is mounted on the two mounting screws 9 and 10.

The adapter device advantageously comprises a locking mechanism 16 for each cheek 8.

Each locking mechanism 16 on the one hand, has a teat 8b secured to the corresponding cheek 8 passing through it and, on the other hand, is associated with a retaining means 17 mounted on said teat 8b. The retaining means 17 consists of an easily-removable pin 17a.

According to one embodiment of the adapter device, each cheek 8 has a teat 8b extending at right angles to the plane (vertical) in which said cheek 8 extends. This teat 8b passes through the corresponding orifice 16a made in the locking mechanism 16. The pin 17a is mounted on the teat 8b so as to avoid the locking mechanism 16 disengaging from the heads 9b, 10b.

The orifice 16a has a suitable shape, for example oblong or elongate, to allow the teat 8b to occupy different positions therein according to the relative pivoting between the adapter bar 1 and the cheeks 8. Specifically, the adapter bar 1 pivots about the axis L (see FIGS. 1 and 2 in particular) of the mounting screw 10 under the action of the clamping screw 13. Such pivoting moves the mounting screw 9 in the opening 8a, which opening is, for example, oblong, and also alters the position of the locking mechanism 16 with respect to the corresponding cheek 8 and therefore of the teat 8b. The shape and/or size of the orifice 16a have/has therefore to be chosen such that the teat 8b can pass through said orifice 16a regardless of the position of the adapter bar 1 with respect to the cheeks 8.

FIG. 3 depicts a top view of the adapter device according to the invention before it is mounted on a hitching bar 20 of a tractor.

FIG. 4 depicts the adapter device of FIG. 3, in the direction F shown in said FIG. 3.

To use the adapter device, the mounting screws 9, 10 of the locking rod 11 have to be slackened so that the hitching bar 20 can be introduced into this device in the direction F of FIG. 3. The hitching bar 20 is then fixed to the adapter bar 1 using the connecting pin 5, if necessary employing the bushing 6.

The adapter bar 1 is then pivoted upward in the direction of arrow G of FIG. 2 to cause the hitching bar 20 to be gripped between the adapter bar 1 and the locking rod 11. The mounting screws 9 and 10 are then tightened so as to grip the hitching bar 20 laterally between the bearing plates 12 secured to the cheeks 8.

Tightening the nut 11b of the locking rod 11 improves the cohesion thus obtained. The bearing plates 12 are also able to grip the hitching bar 20 before the cheeks 8 come into abutment against the adapter bar 1. A gap 30 (see, for example, FIG. 4) thus remains to allow optimal tightening of the hitching bar 20. This is important when the hitching bar 20 has a width slightly smaller than or equal to the width of the adapter bar 1. The tightening of the mounting screws 9, 10 and of the locking rod 11 can therefore be optimized and any mechanical play between the hitching bar 20 and the adapter bar 1 is eliminated.

The adapter device according to the invention has the advantage of eliminating the mechanical play between the hitching bar 20 and the adapter bar 1 and therefore of adapting to the dimensional spread that hitching bars 20 may exhibit.

The excellent mechanical cohesion between the hitching bar 20 and the adapter device also allows the forces and stresses from a hitching drawbar 23 to be distributed more uniformly.

Another not-insignificant advantage of the device stems from the locking mechanism 16 which prevents the mounting screws 9, 10 from slackening.

What is claimed as new and desired to be secured by Letters Patent of the United States is:

1. An adapter device for a hitching bar of an agricultural tractor comprising:
    an adapter having ends bar equipped with a hitching pin near one of the ends of said adapter bar, said hitching pin extending substantially vertically when the adapter device is mounted on the hitching bar, and a connecting pin intended to pass through an opening made in said hitching bar, and
    means of a mechanical play between the hitching bar and the adapter bar
    wherein said means for reducing mechanical play between the hitching bar and the adapter bar comprise:
        two cheeks mounted laterally one on each side of the adapter bar using two mounting rods, one of the mounting rods acting as an axis about which said adapter bar can pivot with respect to said cheeks,
        a locking rod connected to the two cheeks and located in a region lying between the two mounting rods, and
        a clamping screw connected to the adapter bar and bearing against a part secured to at least one of the cheeks so as to be able to clamp the hitching bar between the adapter bar and the locking rod when the clamping screw is turned, said mounting rods being used to clamp the adapter bar and the hitching bar laterally via the two cheeks.

2. Adapter device as claimed in claim 1, wherein the mounting rod which acts as an axis of pivoting for the adapter bar, lies at an end of said adapter bar furthest from the end at which the hitching pin lies.

3. Adapter device as claimed in claim 1, wherein the other mounting rod passes through an opening made in each cheek which allows the adapter bar to pivot with respect to said cheeks about the mounting rod which acts as an axis of pivoting.

4. Adapter device as claimed in claim 3, wherein said opening is an oblong opening substantially centered on the axis of the mounting rod which acts as an axis of pivoting.

5. Adapter device as claimed in claim 1, wherein the two mounting rods are substantially parallel.

6. Adapter device as claimed in claim 1, wherein the mounting rods extend substantially horizontally when the adapter device is mounted on the hitching bar.

7. Adapter device as claimed in claim 6, wherein the locking rod extends higher up than the two mounting rods.

8. Adapter device as claimed in claim 1, wherein the locking rod passes through a corresponding opening in each cheek.

9. Adapter device as claimed in claim 1, wherein the locking rod consists of a screw capable of clamping the cheeks laterally.

10. Adapter device as claimed in claim 1, wherein the locking rod extends substantially parallel to the mounting rod which acts as an axis of pivoting for the adapter bar.

11. Adapter device as claimed in claim 1, wherein the part secured to at least one of the cheeks, and against which the clamping screw bears, consists of a horizontal pin passing through the cheeks and on which said cheeks can slide laterally.

12. Adapter device as claimed in claim 11, wherein the pin extends substantially parallel to the mounting rod which acts as an axis of pivoting for the hitching bar.

13. Adapter device as claimed in claim 11, wherein the part secured to at least one of the cheeks and against which the clamping screw bears, extends under the adapter bar.

14. Adapter device as claimed in claim 1, wherein the clamping screw passes through a hole made in the adapter bar.

15. Adapter device as claimed in claim 14, wherein the hole made in the adapter bar is a tapped hole.

16. Adapter device as claimed in claim 1, wherein the clamping screw is substantially parallel to the hitching pin.

17. Adapter device as claimed in claim 1, wherein the connecting pin is mounted removably on the adapter bar.

18. Adapter device as claimed in claim 1, wherein the connecting pin extends between the two mounting rods.

19. Adapter device as claimed in claim 18, wherein the connecting pin extends between the mounting rod closest to the hitching pin and the locking rod.

20. Adapter device as claimed in claim 1, wherein the mounting rods are screws.

21. Adapter device as claimed in claim 20, and which is provided with a mechanism for locking the mounting screws.

22. Adapter device as claimed in claim 21, wherein the locking mechanism is a tool for tightening and slackening the mounting screws.

23. Adapter device as claimed in claim 21, wherein the locking mechanism is a tool for tightening and slackening the locking rod produced in the form of a screw.

24. Adapter device as claimed in claim 21, and which comprises a locking mechanism for each cheek.

25. Adapter device as claimed in claim 24, wherein each locking mechanism has a teat secured to a corresponding cheek passing through said corresponding cheek and, is associated with a retaining means mounted on said teat.

26. Adapter device as claimed in claim 25, wherein the retaining means consists of an easily-removable pin.

* * * * *